US008110953B2

(12) United States Patent

Ferrari et al.

(10) Patent No.: US 8,110,953 B2

(45) Date of Patent: Feb. 7, 2012

(54) POWERED CHUCK-BEARING GROUP FOR A PRINTING MACHINE

(75) Inventors: Vittorio Ferrari, Reggio Emilia (IT); Milo Campioli, Reggio Emilia (IT)

(73) Assignee: OMSO Decomac-Societa' a Responsabilita' Limitata, Reggio Emilia (IT)

( * ) Notice: Subject to any disclaimer, the term of this patent is extended or adjusted under 35 U.S.C. 154(b) by 49 days.

(21) Appl. No.: 12/815,549

(22) Filed: Jun. 15, 2010

(65) Prior Publication Data

US 2010/0313776 A1 Dec. 16, 2010

(30) Foreign Application Priority Data

Jun. 15, 2009 (IT) .............................. RE2009A0058

(51) Int. Cl.
*H02K 11/00* (2006.01)

(52) U.S. Cl. ........................ 310/67 R; 310/68 R; 310/91

(58) Field of Classification Search ................ 310/67 R, 310/68 R, 68 B, 91, 156.08–156.11; 101/407.1
See application file for complete search history.

(56) References Cited

U.S. PATENT DOCUMENTS 3,950,199 A 4/1976 Lucas
4,423,880 A * 1/1984 Kosmowski ................ 279/4.07
5,481,910 A * 1/1996 Gutman .......................... 73/162

FOREIGN PATENT DOCUMENTS

EP 257136 A1 3/1988
EP 462340 A1 * 12/1991
EP 471512 A1 2/1992
EP 1769916 A2 4/2007
FR 2802145 A1 6/2001
GB 1137712 A 12/1968
JP 08168210 A * 6/1996
WO 2007090728 A2 8/2007

* cited by examiner

*Primary Examiner* — Tran Nguyen

(74) *Attorney, Agent, or Firm* — Browdy and Neimark, PLLC

(57) ABSTRACT

A motorized chuck-bearing group for a printing machine, powered by a brushless motor, comprises a casing housing a stator coil and a rotor, controlled both in velocity and activation times by a control circuit comprising an encoder device, in which a shaft supports permanent magnets in a peripheral arrangement, the shaft being coupled, internally of the casing, to the encoder device and extending outside the casing such as to support a chuck which rotates an object to be printed.

7 Claims, 2 Drawing Sheets

POWERED CHUCK-BEARING GROUP FOR A PRINTING MACHINE

TECHNICAL FIELD

The present invention relates to printing machines for objects of generally cylindrical shape and utilizing offset, screen, flexographic, or similar printing systems, wherein the objects are rotated in contact with a print matrix.

More in general, the invention involves the printing of objects using systems that include a rotating chuck acting to present an object to be printed to a print matrix.

BACKGROUND OF THE INVENTION

The matrix can be flat or cylindrical, and in both cases the speed of the surface to be printed and the speed of the matrix, along the line of contact between surface and matrix, must be strictly matched such as to avoid slippage resulting in smudging and poor print quality.

In order to achieve this result the prior art utilizes a chuck and a matrix connected by a mechanical link motion device, at least during the printing stage, which synchronizes the movements of the chuck and matrix.

Generally the matrix is located in a stationary printing station, while the chuck is one of a plurality of chucks supported radially in equidistant positions by a rotating platform known as a carousel and which advances in steps such as to successively present the chucks to the print station.

It is immediately evident that the need to provide mechanical link motion devices represents a laborious, complicated, and expensive solution, and this is not the only drawback in the prior art.

The main drawback is frequently the bulk of the chucks, which in solutions involving non-integral motor drives must be of significant axial lengths in order to leave space for the drive mechanisms.

It is consequently necessary to construct a carousel of suitably large diameter, in turn resulting in relatively high moments of inertia.

This type of printing machine generally exhibits an operating capacity of over four hundred cycles per minute, which means that the carousel must start and stop moving four hundred times per minute. The carousel is consequently subject to levels of acceleration that require very high material rigidity, robustness, and in particular the lowest possible inertia, which is not always possible when carousels are fitted to chucks of known type.

Italian patent application PR2003A000015 describes a printing machine, of screen printing type, wherein an object-bearing chuck is powered by a brushless motor, a shaft of which motor is mechanically connected via a transmission shaft to the object-bearing chuck.

This solution resolves some of the problems posed by exclusively mechanical-drive machines, but without resolving the problems of axial bulk or of the significant complexity resulting from a need to maintain both the transmission shaft and the object support chuck in motion.

Also unresolved are the problems deriving from a high moment of inertia of the rotating parts, which induces particularly high inertial forces as a consequence of the rotational velocity of the rotating parts and the extremely short drive and stop times required.

SUMMARY OF THE INVENTION

The aim of the invention is to provide a motorized group of relatively limited axial bulk and high torsional rigidity in comparison with solutions of known type, which directly supports the chuck without requiring additional means of support.

The aim of the invention is attained by a group exhibiting the characteristics cited in the independent claim.

The group of the invention comprises a casing, enclosing a stator coil and a rotor, controlled both in velocity and activation times by a control circuit comprising an encoder device, in which casing a motor shaft is rotatably supported, the motor shaft supporting peripherally-distributed permanent magnets and comprising a chuck exhibiting means for supporting an object to be printed.

The dependent claims define ulterior useful characteristics and improvements of the invention.

The advantages and the constructional and functional characteristics of the invention will better emerge in the detailed description that follows, which illustrates a preferred embodiment thereof provided by way of non-limiting example, with the aid of the accompanying figures of the drawings, in which:

DETAILED DESCRIPTION OF THE INVENTION

Figure 1:
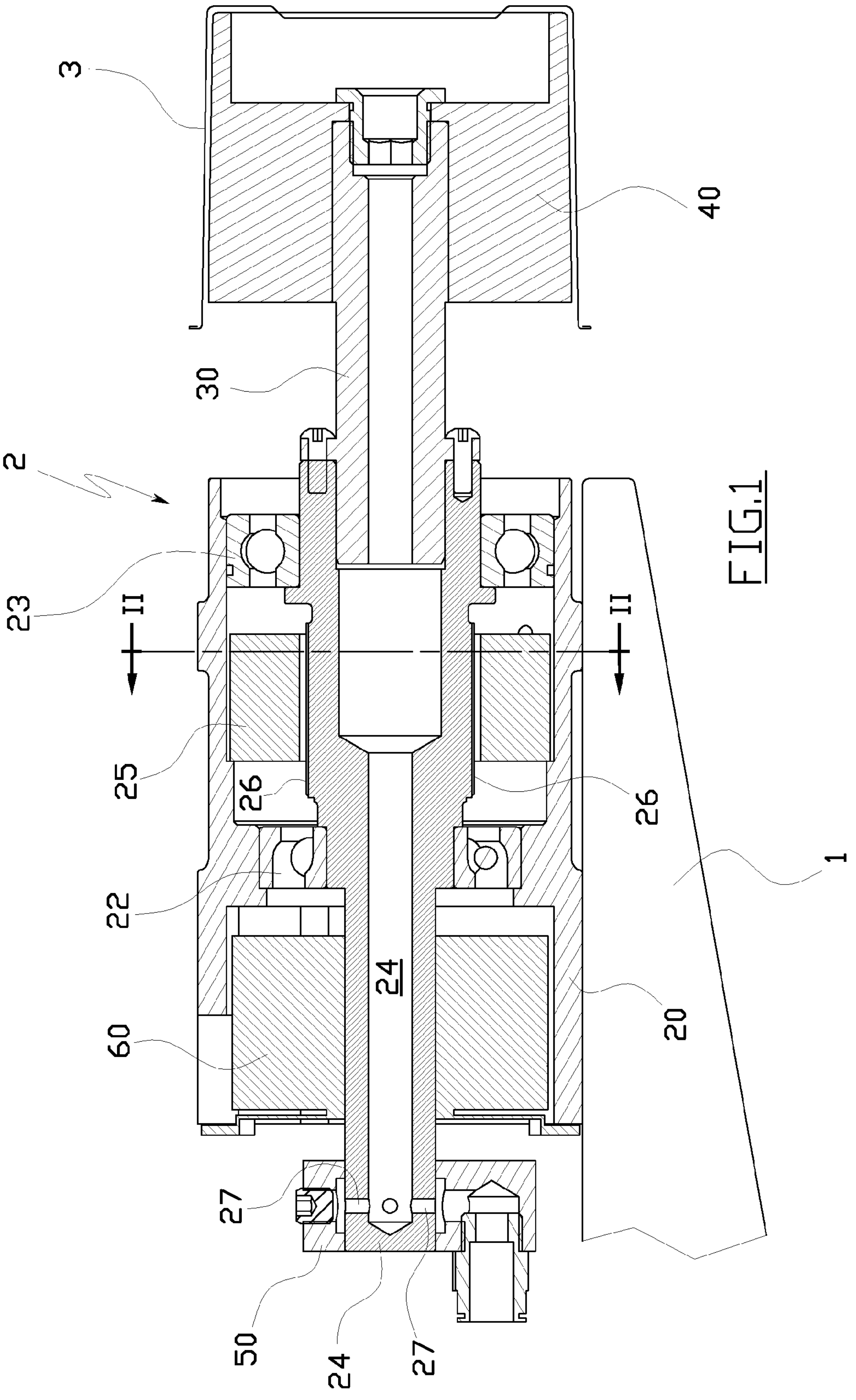
FIG. 1 is an axial cross-section of the group of the invention.
Figure 3:
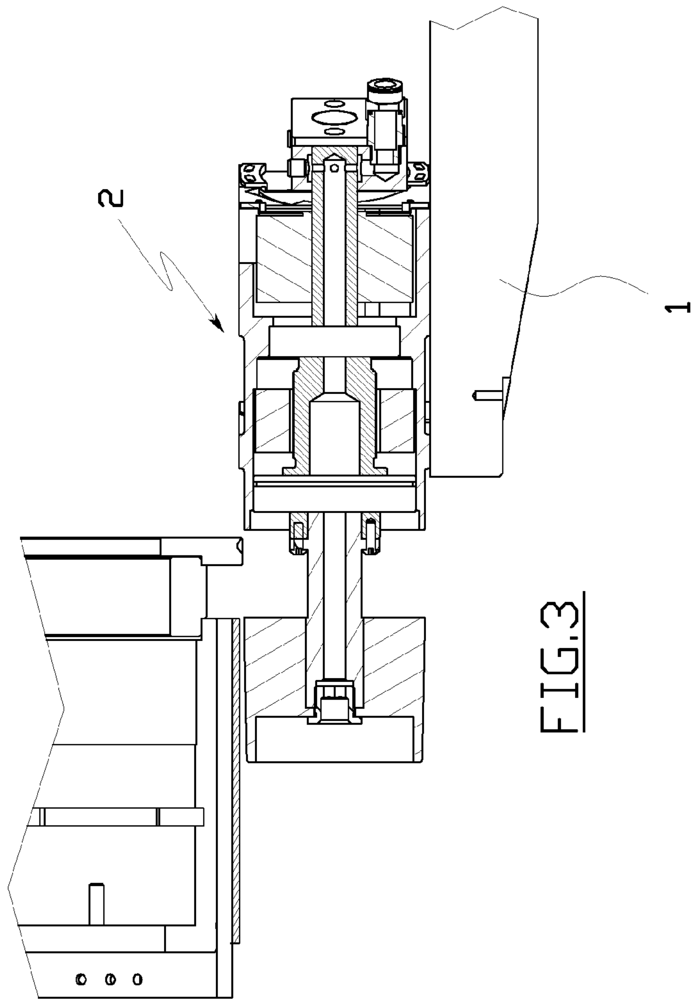
FIG. 3 illustrates the group fitted on a carousel of a printing machine associated to a printing cylinder.
Figure 2:
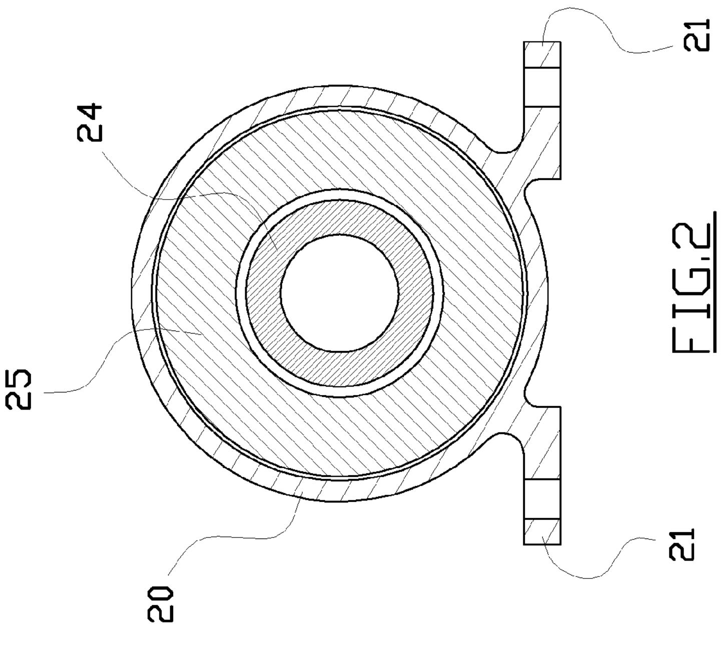
FIG. 2 is the cross-section II-II of FIG. 1.

The figures illustrate a carousel 1 of a printing machine, supported and driven by known means which are not illustrated.

On a periphery of the turntable, or carousel 1, groups 2 are arranged which comprise the chucks bearing objects to be printed, in the example plastic containers denoted by 3.

The groups 2 comprise an external casing 20 provided with flanges 21 on a base for fixing the groups onto the carousel.

As mentioned herein above, the groups 2 are radially orientated and fastened to the carousel at equidistant positions.

Seatings are afforded inside the casing 20 for two roller bearings, respectively denoted by 22 and 23.

The bearings support, rotatingly but axially fixed, a single axially-hollow shaft 24 along almost an entire length of the shaft 24.

Between the bearings 22 and 23, the hollow shaft 24 exhibits a section located inside a stator coil 25 of an electrical motor. On the section thereof which is adjacent to the stator 25, the shaft 24 comprises a series of equidistant permanent magnets 26.

The assembly of the hollow shaft, and relative permanent magnets, and the stator coil form a controlled speed and travel brushless motor.

In the illustrated example the motor develops at least 500 W of power and has a speed of from just above zero to 2000 rpm.

The terminal portion of the hollow shaft is accessible axially from the outside of the casing and forms a seating for housing and fixing a coaxial adapter shaft 30, axially perforated and fastened to the shaft by mechanical means, and bearing the chuck 40 at an end thereof The chuck 40 pneumatically retains a container 3 to be printed.

In the illustrated example the shaft 24, the shaft 30 and the chuck 40 are made of steel, and the casing is made of aluminium or an equivalent alloy.

At the opposite end of the axial cavity the hollow shaft 24 is closed and extends into a pneumatic distributor 50 with which the shaft 24 communicates through radial holes 27.

The shaft cavity is in communication via the distributor 50 with means under depression.

The shaft 24 can be assembled from a plurality of aligned parts, joined by a screw-coupling.

The end of the hollow shaft adjacent to the means under depression is associated to an encoder device 60, of known type, which precisely controls the rate of rotation of the shaft and sends signals to the motor control and command circuit which controls the current in the stator coil 25.

In the illustrated example a controller of commercially-available type is used.

The motor control and command circuit is also of known type and consequently is not illustrated.

The combination of means described above provides a motorized chuck of very limited axial length and high rigidity, which does not require extraneous means for supporting the carousel, and which is of simple, reliable, and economic construction.

The device functions as follows.

The carousel 1 advances in steps, positioning containers 3 below the printing station one at a time, such that they are tangentially aligned with the print matrix.

The containers 3 are retained on the chuck by the depression created through the axial cavity of the shaft and the pneumatic distributor 50.

When the container is in the printing position, the brushless motor comprising the stator coil 25 rotates the container at a controlled velocity such that the peripheral velocity of the container is the same as the peripheral velocity of the print roller.

Between one print station and the next the chucks supporting the containers are maintained in rotation at a controlled speed such that they are perfectly in phase with the subsequent print station.

The print roller can be powered using various means, all of known type, including coupling with a brushless type motor which offers precision control over rotation times and velocities.

The invention is not limited by the illustrated example, and variants and improvements could be introduced without forsaking the ambit of the following claims.

The invention claimed is:

1. A motorized chuck-bearing group for a printing machine, wherein the chuck-bearing group is powered by a brushless motor, comprising a casing wherein a stator coil and a rotor are arranged, the rotor is controlled both in velocity and activation times by means of a control circuit comprising an encoder device, the motor further comprising a shaft that supports peripherally-distributed permanent magnets and the shaft is coupled internally of the casing to the encoder device, and the shaft extends outside of the casing to support a chuck that rotates an object to be printed.

2. The motorized chuck-bearing group of claim 1, wherein the shaft is hollow and is coupled via a pneumatic distributor for creating a depression.

3. The motorized chuck-bearing group of claim 1, wherein the shaft is supported to the casing by means of two roller bearings, a first roller bearing being located in proximity of an open end of the casing, a second roller bearing being located internally in the casing, and the casing supporting the stator circuit of the motor between the roller bearings.

4. The motorized chuck-bearing group of claim 3, wherein the shaft projectingly extends beyond the second roller bearing to support the encoder device internally of the casing.

5. The motorized chuck-bearing group of claim 3, wherein the motor shaft is axially hollow and extends beyond the casing on the encoder side, wherein the shaft is connected via a rotating distributor under depression.

6. The motorized chuck-bearing group of claim 5, wherein the hollow motor shaft is constructed from a plurality of aligned portions.

7. The motorized chuck-bearing group of claim 5, wherein the aligned portions of the shaft are united by screw coupling to one another.

* * * * *